United States Patent
Heck et al.

(10) Patent No.: US 8,423,417 B2
(45) Date of Patent: Apr. 16, 2013

(54) SYSTEM AND METHOD FOR AUTOMATICALLY SELECTING ADVERTISING DATA FOR STORED CONTENT

(75) Inventors: Christopher Heck, Lees Summit, MO (US); Nicholas Nicas, Blue Springs, MO (US); James Huffman, Kansas City, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 890 days.

(21) Appl. No.: 11/942,462

(22) Filed: Nov. 19, 2007

(65) Prior Publication Data

US 2009/0132358 A1    May 21, 2009

(51) Int. Cl.
*G06Q 40/00* (2012.01)

(52) U.S. Cl.
USPC .................................... 705/26.1; 705/26.3

(58) Field of Classification Search ................ 705/26.1, 705/26.3
See application file for complete search history.

(56) References Cited

U.S. PATENT DOCUMENTS

2006/0111985 A1    5/2006  Sheldon

*Primary Examiner* — Daniel Felten
(74) *Attorney, Agent, or Firm* — G. Michael Roebuck

(57) ABSTRACT

A method for delivering advertising data, comprising receiving end user data at a server, the data indicating available advertising spots in content data stored at an end user device; and updating from the server advertising data in the available advertising spots for presentation of the advertising data during replay of the content data at the end user device. A system is disclosed for performing the method. A data structure embedded in a computer readable medium is disclosed for containing data for performing the method.

24 Claims, 6 Drawing Sheets

SYSTEM AND METHOD FOR AUTOMATICALLY SELECTING ADVERTISING DATA FOR STORED CONTENT

FIELD OF THE DISCLOSURE

The present disclosure relates to the field of selecting advertising data for content data.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content choices available to subscribers. Television advertisers now target advertisements based on regions in which the television signal is delivered. For example, viewers in a New York state region will receive different advertising data than viewers in a Texas state region.

DETAILED DESCRIPTION

Figure 1:
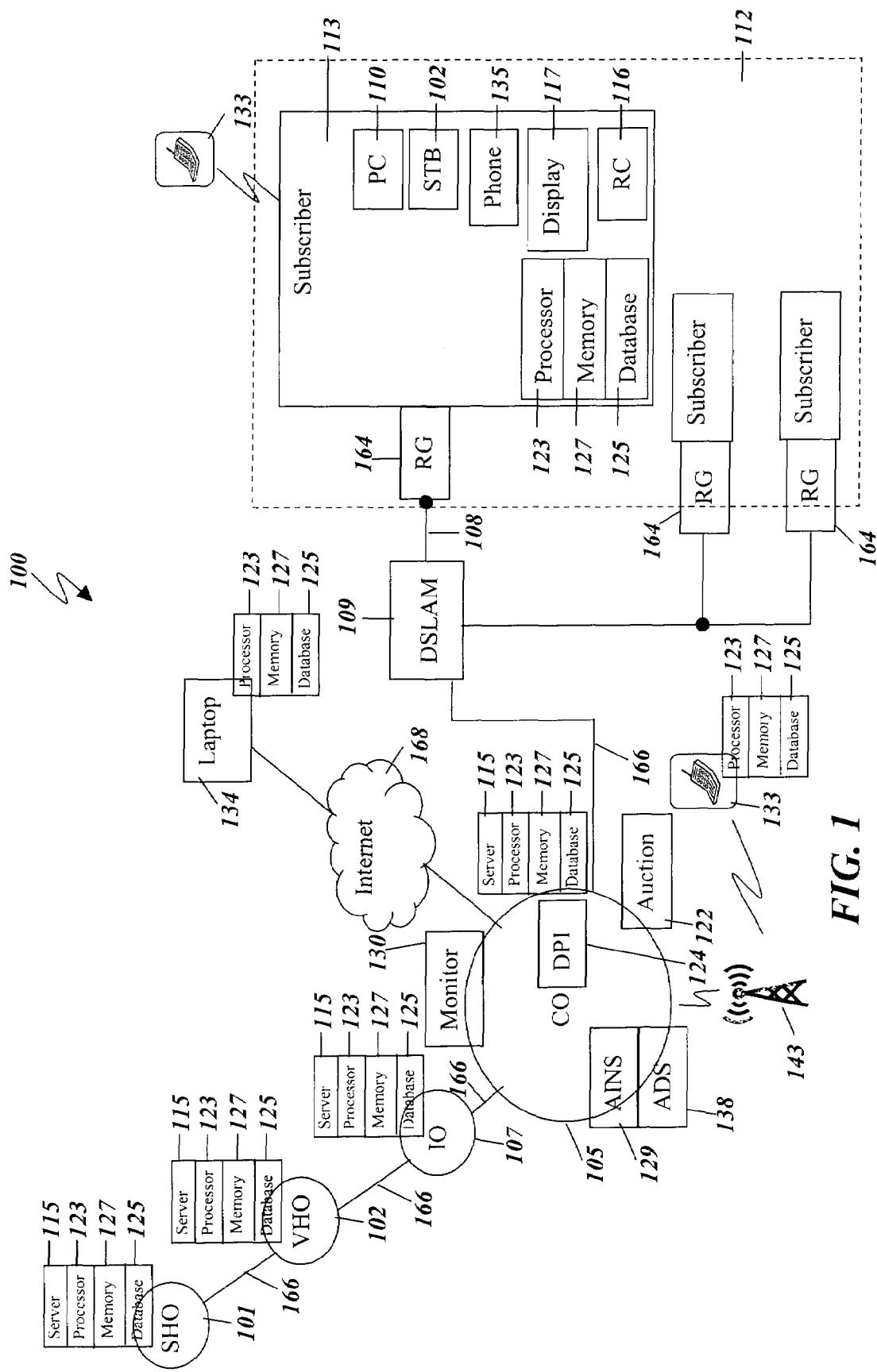
FIG. 1 depicts an illustrative embodiment of a system for selecting advertising data for available advertising spots in content stored on an end user device.

In an illustrative embodiment, a system and method are disclosed that provide targeted advertising data for presentation during replay of stored content data such as video data stored at an end user device. In another embodiment, the content data is image data stored on an end user device. In another embodiment, the content data is voice over internet protocol (VoIP) data stored on an end user device. In another embodiment, the content data is audio data stored on an end user device. In another embodiment, the content data is image data stored on an end user device. The end user devices can include but are not limited to cell phones, mobile computers and television displays associated with a set top box. The available advertising spots in content stored it end user devices are centrally inventoried and auctioned based on the characteristics of the stored content (age of content in storage, number of content replays, and age of advertising data in the stored content), end user device type and end user demographic. For purposes of this disclosure, replay of content data and presentation of advertising data refer to rendering the content and advertising data at the end user device from data stored at the end user device storage for presentation on the end user device, that is, displaying video data on a video display, displaying image data on an image display, displaying text data on a text display, displaying VoIP data on a text display, reproducing audio data or VoIP data on a sound reproduction device such as a loud speaker at the end user device. Other forms of data and data rendering or presentation are also within the scope of the invention disclosed herein.

In another embodiment, a method for delivering advertising data is disclosed, the method comprising receiving end user data at an internet protocol television (IPTV) server, the data indicating available advertising spots in content stored at an IPTV end user device; and updating from the IPTV server, advertising data for the available advertising spots. In another embodiment, the method further includes conducting an auction for the available advertising spots at the IPTV server, wherein the advertising data are provided by a winning bidder from the auction. In another embodiment of the method, the auction is based on attributes for the available advertising spots selected from the group consisting of end user demographics, content type, end user device type and available advertising spot type.

In another embodiment of the method, the auction is further based on how long the content has been stored at the end user device. In another embodiment of the method the end user data further comprises command data from the end use device indicating content storage, playback and deletion at the end user device. In another embodiment of the method, the auction is further based on how many times the content data has been played back at the end user device. In another embodiment of the method, the end user data further comprises tokens indicating available advertising spots in content data stored on the end user device and determining further comprises comparing the tokens to an IPTV server data base to determine available advertising spots in the content data. In another embodiment of the method, the tokens are sent to the end user device in content data sent from the IPTV server.

In another embodiment a system for delivering advertising data is disclosed, the system comprising a processor in data communication with a computer readable medium; a computer program comprising processor executable instructions stored in the computer readable medium, the computer program further comprising instructions to receive end user data at an IPTV server, the end user data indicating available advertising spots in content data stored at an IPTV end user device; and instructions to update from the IPTV server, advertising data in the available advertising spots. In another embodiment of the system, the computer program further includes instructions to conduct an auction for the available advertising spots at the IPTV server, wherein the advertising data are provided by a winning bidder from the auction. In another embodiment of the system, the auction is based on attributes for the available advertising spots selected from the group consisting of demographics, content type, end user device type and advertising type.

In another embodiment of the system, the auction is further based on how long the content data has been stored at the end user device. In another embodiment of the system, the end user data further comprises command data from the end use device indicating content data storage, playback and deletion at the end user device. In another embodiment of the system, the auction is further based on how many times the content data or advertising data has been played back at the end user device. In another embodiment of the system, the end user data further comprises tokens indicating available advertising spots in content data stored on the end user device and determining further comprises comparing the tokens to data in an IPTV server data base to determine available advertising spots in the content. In another embodiment of the system, the tokens are sent to the end user device in content data from the IPTV server.

In another embodiment, a computer program comprising executable instructions stored in the computer readable medium is disclosed, the computer program further comprising instructions to receive end user data at an IPTV server, the end user data indicating available advertising spots in content data stored at an IPTV end user device; and instructions to update from the IPTV server, advertising data in the available advertising spots. In another embodiment of the medium, the end user data further comprises tokens indicating content stored on the end user device and determining further comprises comparing the tokens to data in an IPTV server data base to determine available advertising spots in the content.

In another embodiment, a method for displaying advertising data is disclosed, the method including sending end user data from an IPTV end user device to an IPTV server, the end user data indicating available advertising spots in content data stored at the end user device; and receiving at the end user device, advertising data from the IPTV server for the available advertising spots. In another embodiment of the method, the end user data further comprises content tokens indicating content data stored on the end user device and determining further comprises comparing the tokens to an IPTV server data base to determine available advertising spots in the content stored on the end user device.

In another embodiment, a data structure for storing data in a computer readable medium is disclosed, the data structure comprising a first field for containing data indicative of an available advertising spot in content stored at an end user device; and a second field for containing data indicative of a device type for the end user device. In another embodiment of the data structure, the first field further comprises a token field for containing data indicating content containing the available advertising spot. In another embodiment of the data structure the device type is selected from the group consisting of a mobile telephone, video display and portable computer.

Turning now to FIG. 1, FIG. 1 depicts an illustrative embodiment of a system for automatically selecting advertising data for a subscriber based on content of video and other data stored at end user devices in a triple-play IPTV system. The triple-play IPTV system provides IPTV video data, VoIP data and Internet data services to end user devices. The triple play IPTV system provides IPTV video, high speed internet video and other data from high speed internet and VoIP data and video. The video can be video data including but not limited to television programming, movies, and video on demand in which Meta data describing the video data may be supplied; or video data without associated Meta data for subscriber created videos such as video data provided on popular Internet sites such as My Space™ and You Tube™. Meta data for movies and television programs include title and description for the video.

In an illustrative embodiment, the IPTV system builds subscriber profiles for IPTV end users (also referred to herein as "subscribers") by aggregating and correlating subscriber related statistics and subscriber activity data along with other subscriber data and demographic information such as gender, age, income, languages spoken, areas of interest, etc. Some of the subscriber profile data can be volunteered by an IPTV subscriber during an IPTV registration process. In another particular embodiment, the subscriber profile data further contains data for which a subscriber has opted in for monitoring and use by an IPTV triple-play system for the purposes of automatically receiving targeted advertising data. Subscriber preferences for particular advertising classes of current viewers can be estimated from data included in the subscriber profile, including but not limited to device type, subscriber type, and device state based on the subscriber activity data.

Based on subscribers' interests, background, and subscriber profiling results, purchases, locations visited as anchored by proximity data, demographics and subscriber activity data one of the following targeted advertising data selection methods and systems described herein or an equivalent thereof can be utilized to estimate an auction price and select targeted advertising for content stored at an end user device. Targeted advertising is automatically selected and made available to personalize advertising data and television commercial delivery to IPTV television displays, portable subscriber data and messaging devices such as mobile or cell phones and video, website banners and pop up displays on a PC or mobile Laptop computer.

As shown in FIG. 1, the IPTV system 100 delivers video content and targeted advertising to subscriber house holds 113 and associated end user devices (also referred to herein as subscriber devices) which may be inside or outside of the household. Television advertising data is inserted or marked as available by the advertising server 138. In the IPTV system, IPTV video data are first broadcast in an internet protocol (IP) from a server at a super hub office (SHO) 101 to a regional or local IPTV video hub office (VHO) server 103, to a central office (CO) server 105 and intermediate office (IO) 107. The IPTV system 100 includes a hierarchically arranged network of servers wherein the SHO transmits video and advertising data to a video hub office (VHO) 103 and the VHO transmits to an IPTV server location close to a subscriber, such as a CO server 105 or IO 107. In another particular embodiment, each of the SHO, VHO, CO, and IO is interconnected with an IPTV transport 166. The IPTV transport 166 may consist of high speed fiber optic cables interconnected with routers for transmission of internet protocol data. The IPTV servers also provide data communication for data and video associated with Internet and VoIP services to subscribers. End users can access the internet 168 and WiFi cellular phone system 143 via the triple IPTV system.

Actively viewed IPTV channels are sent in an Internet protocol (IP) data multicast group to access nodes such as digital subscriber line access multiplexers (DSLAMS) 109. A multicast for a particular IPTV channel is joined over a DSL line 108 by the set-top boxes (STBs) at IPTV subscriber homes from the DSLAM. Each STB includes processor 123, a memory 127, and a database 125. Each SHO, VHO, CO and IO includes a server 115, processor 123, a memory 127, and a database 125. The processor 123 further includes a network interface. The processor reads computer programs containing executable instructions from a computer readable medium such as memory 127. The network interface functions to send and receive data over the IPTV transport 166 and DSL line 108. The CO server delivers IPTV, Internet and VoIP video content and data to the subscriber via the DSLAM. The television, internet and VoIP data and content can be delivered via multicast and unicast television advertising depending on a single subscriber or a targeted television advertising group of end user client subscriber devices to which the advertising data is directed.

In another particular embodiment, subscriber devices, including but not limited to, wire line phones 135, portable phones 133, mobile computer 134 personal computers (PC)

110 and STB 102 communicate with a communication system, e.g., IPTV system through residential gateway (RG) 164 and high speed communication lines 108 and 166. In another particular embodiment, deep packet inspection (DPI) device 124 inspects VoIP, Internet and IPTV video data, data, commands and Meta data transmitted between the subscriber devices (subscriber activity data) and the IPTV system servers. In another illustrative embodiment subscriber activity data are monitored and collected whether or not the subscriber's devices are in the household 113 or traveling as mobile devices outside of the household. When outside of the household, subscriber mobile device activity data and transactions data are monitored by a communication network (e.g., IPTV system) servers or nodes which associate the subscriber activity data with particular subscriber's end user devices. In another particular embodiment, subscriber activity data such as communication and purchase transactions are inspected by DPI devices located in a communication system, e.g., IPTV system servers. These communication system servers route the subscriber activity data to an IPTV server such as the CO in which the subscriber activity data for a subscriber are stored for processing. While an IPTV system has been used as an example in the illustrative embodiment, the disclosure is not meant to be limited to IPTV as other communication systems such as cable television or other digital and analog data delivery systems can be used in other embodiments.

In another particular embodiment, the end user subscriber devices further include but are not limited to a client user computer, a personal computer (PC), a tablet PC, a set-top box (STB), a Personal Digital Assistant (PDA), a cellular telephone, a mobile device, a palm computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a DPI device 124 inspects multicast and unicast data, including but not limited to VoIP video and data, Internet video and data and IPTV video and data, commands and Meta data between the subscriber end user devices and the IPTV system servers and the Internet.

In another illustrative subscriber activity data are monitored and collected whether or not the subscriber devices are in the household 113 or the devices are mobile outside of the household. When outside of the household, subscriber mobile device data are monitored by communication system (e.g., IPTV system) servers which associate the subscriber activity data with each particular subscriber's end user device. In another particular embodiment, subscriber activity data such as IPTV and Internet video selections, and communication and purchase transactions are inspected by DPI devices located in a communication system, e.g., IPTV system servers. These communication system servers route the subscriber activity data to a CO in which the subscriber activity data for a subscriber are stored for processing and become part of the historical behavior profile for the end user.

As shown in FIG. 1 advertising sub groups 112 (comprising a group of subscriber house holds 113) receive multicast advertising data at STB 102 in a video data stream from CO server 107 and DSLAM 109. Individual households 113 receive advertising data at set top box 102 or one of the other subscriber devices. More than one STB 102 can be located in an individual household 113 and each individual STB can receive a separate multicast or unicast advertising stream on IPTV transport 166. In another particular illustrative embodiment, separate and unique advertising data are sent to each set top box (STB) 102 tailored to target the particular subscriber watching television at that particular STB. Each STB 102 has an associated remote control (RC) 116 and video display 117. The subscriber via the RC selects channels for a video data viewing selection (video programs, games, movies, video on demand) and places orders for products and services over the IPTV system 100.

FIG. 1 depicts an illustrative communication system, including but not limited to a television advertising insertion system wherein television advertising data can be inserted at an IPTV server (SHO, VHO, CO, IO) for delivery to an end user client subscriber device, for example, an STB, mobile phone, web browser or personal computer. Advertising data can be inserted into or made available during replay of IPTV or other video data stored at an end user device. The advertising data is delivered via advertising insertion device 129 located at the IPTV CO server or at one of the end user devices such as the STB 102 which inserts the advertising data into video data. The IPTV servers include an advertising server 129 and an advertising database 138. The advertising data is selected by advertising selection element 129 from the advertising database 138 based on an auction for an available advertising spot based on a subscriber profile and delivered by the VHO advertising server 138. An SHO 101 distributes data to a regional VHO 103 which distributes data to local COs 105 which distribute data to a digital subscriber access line access multiplexer (DSLAM) access node to subscriber devices such as STB 102, PC 110, wire line phone 135, mobile phone 133, etc. Advertising data is also selected based on the subscriber profile and sent to a mobile phone or computer associated with the subscriber. The subscriber profile is built based on a subscriber's IPTV, Internet and VoIP activity.

Figure 2:
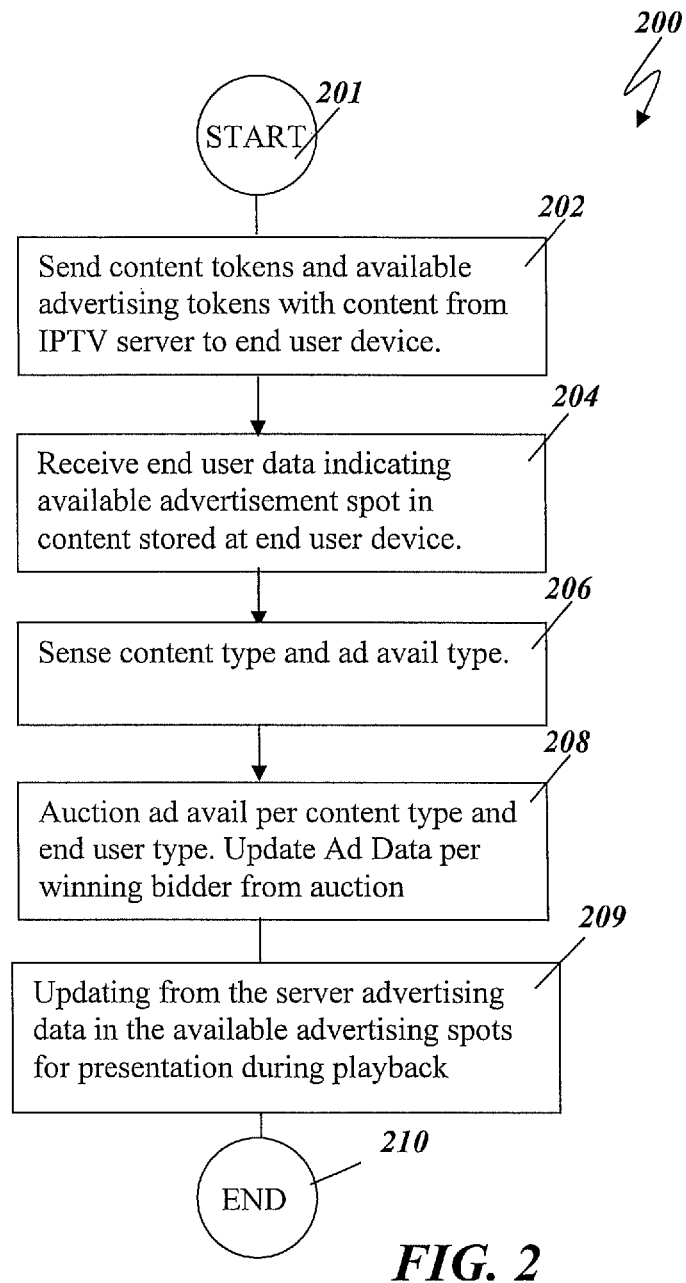
FIG. 2 depicts a flow chart of functions performed in an illustrative method for selecting advertising data for available advertising spots in content stored on an end user device.

Moving now to FIG. 2, in an illustrative embodiment a flowchart 200 of functions is performed as shown in FIG. 2. The order of execution of functions performed is not dictated by any flow chart in this disclosure, as in other embodiments any function can be executed in any order in relation to other functions or left out of execution altogether. An illustrative embodiment starts at terminal 201 and proceeds to block 202. At block 202 the IPTV server sends content tokens and advertising availability tokens along with content data (such as video data) from an IPTV server to an end user device. The tokens contain identification data to allow data associated with the token to be accessed in a data base. Thus, the tokens can be sent and used, stored, deleted or returned without sending the data associated with the token. The data associated with the token can be accessed when needed for display. In a particular embodiment, the content tokens are returned to the IPTV server as content data is stored, deleted or replayed at an end user device. Content and available advertising spots associated with the content data can be accessed in the data base 125 using the content token as an index into the data base. The content tokens and advertising availability tokens associated with particular content and available advertising spots are sent to the end user device. An end user device returns the tokens to the IPTV server where they are used to create an inventory of content stored at an end user device and available advertising spots in the stored content. In another embodiment the content and advertising tokens are created at the end user device and encoded for use in identifying the available advertising spots the inventory of content data and available advertising spots upon return to the IPTV server.

At block 204 an IPTV server receives end user data indicating available advertising spots and the content stored at an end user device. The available advertising spot is inventoried and indexed by end user profile, end user device type and advertising type for the available advertising spot. At block 206 an IPTV server determines and indexes the content type and available advertising spot type. At block 208 an IPTV server auctions the available advertising spot(s) according to the content type and end user type for the end user associated with the available advertising spot. The end user type is based on the subscriber demographics data and subscriber activity data for the end user associated with the available advertising spot. The content type includes but is not limited to sports, news, fashion, shopping, travel and finance. The winning bidder for the auction updates the advertising data at the IPTV server and the IPTV server updates advertising data at the end user device according to the winning bidder in the auction. At block 209 the IPTV server updates advertising data in the available advertising spots for presentation of the advertising data during replay of the content data at the end user device. The IPTV server sends updated advertising data for a particular advertising spot or sends an advertising update token representing advertising data which can be sent separately, either earlier or later than the advertising data, to the end user device having the stored content data and associated available advertising spot. In a particular embodiment, the content and advertising data tokens are used at the end user device for accessing and presenting advertising data associated with the tokens during replay of stored content associated with the content tokens.

Figure 3:
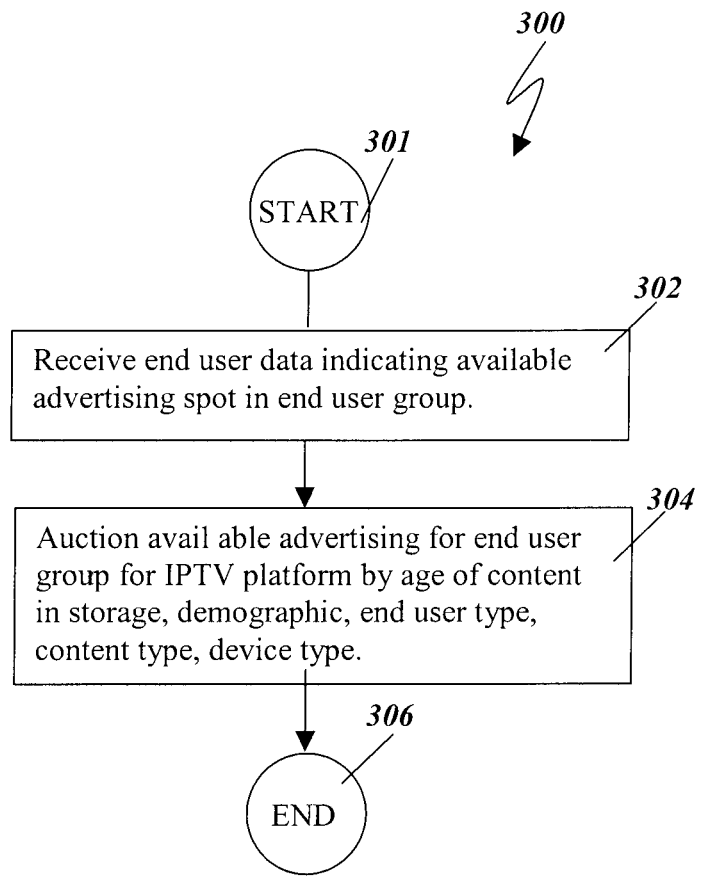
FIG. 3 depicts a flow chart of functions performed in an illustrative method for selecting advertising data for available advertising spots in content stored on an end user device.

Turning now to FIG. 3, in another illustrative embodiment, a flowchart 300 of functions is performed. In a particular embodiment a terminal 300 starts the functions and proceeds to block 302. At block 302 an IPTV server receives end user data indicating available advertising spots in an end user group, that is, in a group of end user devices having stored content containing available advertising spots. The available advertising spots are inventoried and indexed with and average for end user profiles for the group of end users, end user device type and advertising type for the available advertising spot. At block 304 an IPTV server auctions the available advertising spots for the end user group. An end user group can be associated with a particular desired demographic (e.g., teens ages 15-19) or particular server in an IPTV system so that a particular region associated with the server can be targeted with advertising inserted into stored content. The available advertising spot for the end user group is auctioned based the inventoried available advertising spots and on the age of the content data in storage, age of advertising data in the advertising spot, average or selective demographics of the end users in the end user group, content type, and device types for the end user group. The end user group can be segmented into subgroups by demographic, content type and device type and auctioned for advertising spots based on the demographic, content type and device type for the sub group.

Figure 4:
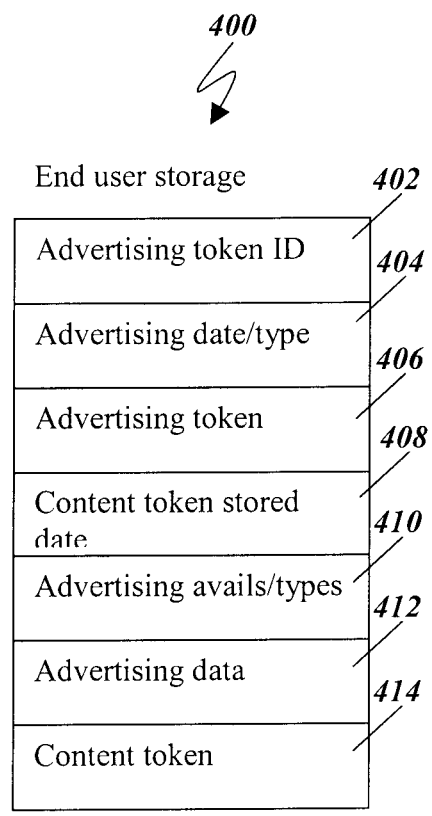
FIG. 4 depicts a data structure embedded in a computer readable medium that is used by a processor and method for delivering advertising data in another illustrative embodiment.

Turning now to FIG. 4, in a particular illustrative embodiment a data structure embedded in a computer readable medium is provided for storing data useful in practicing the present invention. The data structure 400 contains a first field 402 for containing data indicative of an advertising data identifier such as advertising identifier token data. The data structure further comprises a second field for containing data indicative of an advertising date of storage (i.e., the age of the stored data) and advertising type for the advertising data. The advertising date indicates when the advertising data was last updated and when the advertising should be replaced via auction according to the IPTV server auction. The field also contains data indicative of the advertising type so that it might relate to a particular advertising category or class on which an advertiser will bid at auction. The data structure further comprises a third field for containing advertising token data indicative of a token for an advertising data. The advertising data token can be utilized to identify the advertising data and utilized to access advertising data in the data base in performing advertising data updates and auctioning at the IPTV server and the end user device. The data structure further includes a fourth data field 408 for containing data indicative of content stored date. This data indicates when the content data was stored at a particular end user device. The data structure further comprises a fifth field 410 for containing data indicative of an available advertising spots and advertising types for the available advertising spots. The data structure further comprises a sixth field 412 for containing data (such as a token) indicative of the advertising data or contains the advertising data itself. The advertising token data represent available advertising spots and advertising data already in the content data. The data structure further includes a seventh field 414 for containing content token data indicating a content token identifier for the content containing the available advertising spots.

Figure 5:
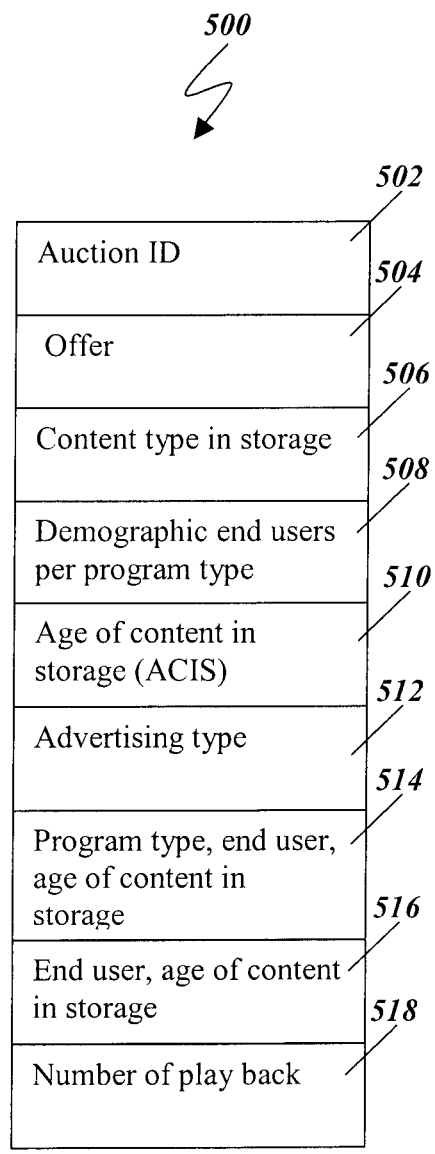
FIG. 5 depicts a data structure embedded in a computer readable medium that is used by a processor and method for delivering advertising data in another illustrative embodiment.

Turning now to FIG. 5, in another embodiment a data structure 500 is provided for containing data at the IPTV server. The data structure 500 provides a first field 502 for containing data indicative of an auction identifier. The data structure further provides a second field 504 for containing data indicative of an offer in the auction identified by the auction identifier. The data structure further comprises a third field 506 containing data indicative of a content type for content data in storage ("stored content") at the end user device. The structure further provides a fourth field 508 for containing data indicative of demographics for end users associated with the end user devices and program type for the stored content. The data structure further comprises a fifth field 510 for containing data indicative of the age of content in storage at the end user device. The data structure further comprises a sixth field 512 for containing data indicative of an advertising type for the content data. The data structure further comprises a seventh field 514 for containing data indicative of a program type and end user type associated with the content type for the stored content data. The data structure further comprises an eight field 516 for containing data indicative of an end user and age of the content in storage that is, how long the content has been in storage at the end user device. The data structure further includes a ninth field 518 for containing data indicative of the number of times the content has been played back, that is, accessed in storage and presented visually or aurally at the end user device. The data structure fields are used for creating end user groups and end user subgroups for auction of available adverting spots in content data stored in end user devices associated with the end user groups and end user sub groups. The advertising type and content data type data indicate a type such as sports, news, travel, etc. for the content and advertising data or available advertising spot.

Figure 6:
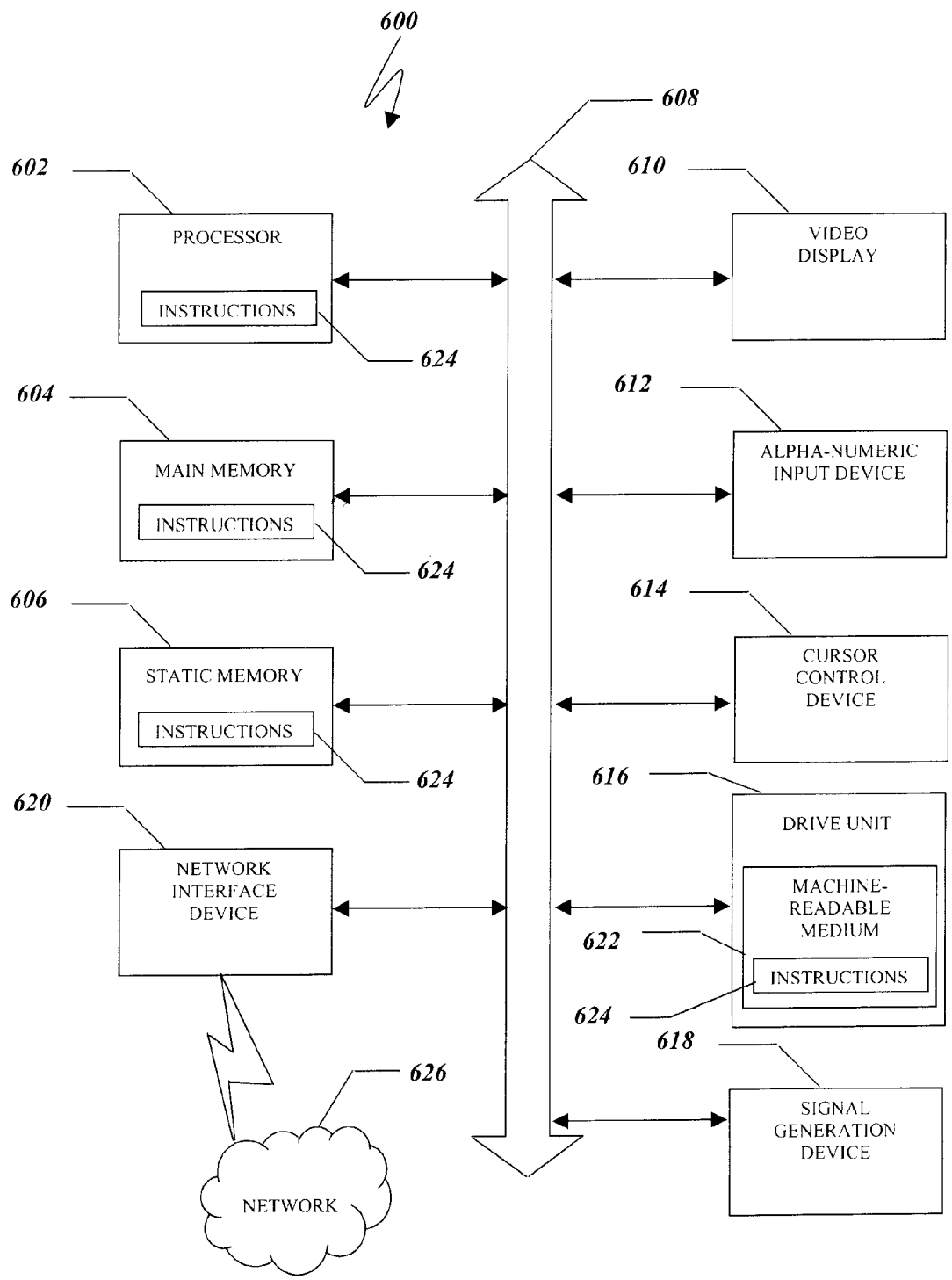
FIG. 6 depicts an illustrative embodiment of a machine for performing functions disclosed in another illustrative embodiment.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein. The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620. The machine readable medium may also contain a data structure for containing data useful in providing a functional relationship between the data and a machine or computer in an illustrative embodiment of the disclosed system and method.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for delivering advertising data, the method comprising:
   receiving at a server, end user data indicating available advertising spots in content data stored at a first end user device having a first end user device type, the first end user device associated with an end user;
   conducting an auction of the available advertising spots based on a preferred end user device type for the end user associated with the first end user device type, wherein the first end user device type is one of a cell phone, a mobile computer and a television display;
   indexing the available advertising spots based on advertising type, wherein the preferred end user device type is different than the first end user device type;
   based on determining that the preferred end user device type is a cell phone, sending an advertisement having the preferred advertising type to a cell phone associated with the end user;
   based on determining that the preferred end user device type is a mobile computer, sending an advertisement having the preferred advertising type to a mobile computer associated with the end user;
   based on determining that the preferred end user device type is a television display associated with a set top box, sending an advertisement having the preferred advertising type to a television display associated with a set top box associated with the end user; and
   updating from the server, advertising data in the available advertising spots for presentation of the advertising data during replay of the content data stored at an end user device having the preferred end user device type.

2. The method of claim 1, wherein the content data is one of video data, audio data, voice over internet protocol data and image data.

3. The method of claim 1, wherein the advertising data are provided by a winning bidder from the auction.

4. The method of claim 1, wherein the auction is further based on demographics, content type, available advertising spot type, age of the content data and a number of replays of the content data.

5. The method of claim 1, wherein the auction is further based on a subgroup of end users formed based on demographic, a content type and an end user device type for the subgroup of end users.

6. The method of claim 1, wherein the end user data further comprises command data from the preferred end user device indicating content storage, playback and deletion of content data at the preferred end user device.

7. The method of claim 1, wherein the auction is further based on how many times the content stored at the preferred end user device has been played back.

8. The method of claim 1, wherein the end user data further comprises tokens data indicating the available advertising spots in the content stored at a preferred end user device, the method further comprising: comparing the tokens data to a server data base to determine the available advertising spots in the content.

9. The method of claim 8, wherein the tokens data are sent to a preferred end user device from the server.

10. A system for delivering advertising data, comprising:
    a processor in data communication with a non-transitory computer readable medium;
    a computer program comprising processor executable instructions stored in the non-transitory computer readable medium, the computer program further comprising:
    instructions to receive at a server, end user data indicating available advertising spots in content data stored at a first end user device having a first end user device type, the first end user device associated with an end user;
    instructions to conduct an auction of the available advertising spots based on a preferred end user device type for the end user associated with the first end user device type, wherein the first end user device type is one of a cell phone, a mobile computer and a television display;
    instructions to index the available advertising spots based on advertising type, preferred advertising type and the preferred end user device type, wherein the preferred end user device type is different than the first end user device type;
    instructions to based on determining that the preferred end user device type is a cell phone, sending an advertisement having the preferred advertising type to a cell phone associated with the end user;
    based on determining that the preferred end user device type is a mobile computer, sending an advertisement having the preferred advertising type to a mobile computer associated with the end user;
    instructions to based on determining that the preferred end user device type is a television display associated with a set top box, sending an advertisement having the preferred advertising type to a television display associated with the end user; and
    instructions to update from the server, advertising data in the available advertising spots for presentation of the advertising data during replay of the content data stored at an end user device having the preferred end user device type.

11. The system of claim 10, wherein the content data further comprises one of video data, audio data, voice over internet protocol data and image data.

12. The system of claim 10, wherein the advertising data are provided by, a winning bidder from the auction.

13. The system of claim 12, wherein the auction is based on attributes for the available advertising spots, wherein the attributes are one of demographics, content type and advertising type.

14. The system of claim 12, wherein the auction is further based on how long the content has been stored at the end user device.

15. The system of claim 10, wherein the end user data further comprises command data from the preferred end user device indicating content storage, content playback and content deletion at the preferred end user device.

16. The system of claim 12, wherein the auction is further based on how many times the content stored at the preferred end user device has been played back at the end user device.

17. The system of claim 10, wherein the end user data further comprises tokens data indicating available advertising spots in content stored on a preferred end user device, the computer program further comprising instructions to compare the tokens to a server data base to determine available advertising spots in the content.

18. The system of claim 15, wherein the tokens are sent to a preferred end user device in content from the server.

19. A computer program comprising executable instructions stored in a computer readable medium, the computer program further comprising instructions to receive end user data at a server, the end user data indicating available advertising spots in content data stored at an end user device and indicating a preferred end user device type for an end user associated with the end user device;
   instructions to receive at the server, end user data indicating available advertising spots in content data stored at a first end user device having a first end user device type, the first end user device associated with an end user;
   instructions to conduct an auction of the available advertising spots based on a preferred end user device type for the end user associated with the first end user device type, wherein the first end user device type is one of a cell phone, a mobile computer and a television display;
   instructions to index the available advertising spots based on advertising type, preferred advertising type and a preferred end user device type, wherein the preferred end user device type is different than the first end user device type;
   instructions to based on determining that the preferred end user device type is a cell phone, send an advertisement having the preferred advertising type to a cell phone associated with the end user;
   based on determining that the preferred end user device type is a mobile computer, sending an advertisement having the preferred advertising type to a mobile computer associated with the end user;
   instructions to based on determining that the preferred end user device type is a television display associated with a set top box, send an advertisement having the preferred advertising type to a television display associated with a set top box associated with the end user;
   and
   instructions to update from the server, advertising data in the available advertising spots for presentation of the advertising data during replay of the content data stored at an end user device having the preferred end user device type.

20. The medium of claim 19, wherein the end user data are tokens data indicating content data stored on the preferred end user device the computer program further comprising instructions to compare the tokens data to a server data base to determine the available advertising spots in the content.

21. A method for displaying advertising data, the method comprising:
   sending from an end user device having a first end user device type to a server, end user data indicating available advertising spots in content data stored at the end user device, age of the content data, a number of replays of the content data, and a preferred end user device type for an end user associated with the end user device, wherein the first end user device type is different than the preferred end user device type; and
   receiving at a second end user device having the preferred end user device type, advertising data from the server for the available advertising spots based on an auction of the available advertising spots for the preferred end user device type, wherein the preferred end user device type is one of a cell phone, a mobile computer and a television display.

22. The method of claim 21, wherein the end user data further comprises content tokens data indicating the content data stored at a preferred end user device the computer program further comprising instructions to compare the tokens data to a server data base to determine available advertising spots in the content.

23. A data structure for storing data in a non-transitory computer readable medium, the data structure comprising:
   a first field for containing data indicative of an available advertising spot in content data stored at an end user device; and
   a second field for containing data indicative of a preferred end user device type for an end user associated with the end user device, wherein the preferred end user device type is one of a cell phone, a mobile computer and a television display associated with a set top box.

24. The data structure of claim 23, wherein the first field further comprises a token field for containing data indicating content data containing the available advertising spot.

* * * * *